US009921735B2

(12) United States Patent
Dou et al.

(10) Patent No.: US 9,921,735 B2
(45) Date of Patent: Mar. 20, 2018

(54) APPARATUSES AND METHODS FOR INPUTTING A UNIFORM RESOURCE LOCATOR

(71) Applicant: Tencent Technology (Shenzhen) Company Limited, Shenzhen, Guangdong (CN)

(72) Inventors: Ningjun Dou, Guangdong (CN); Ming He, Guangdong (CN)

(73) Assignee: Tencent Technology (Shenzhen) Company Limited, Shenzhen (CN)

( * ) Notice: Subject to any disclaimer, the term of this patent is extended or adjusted under 35 U.S.C. 154(b) by 430 days.

(21) Appl. No.: 14/577,548

(22) Filed: Dec. 19, 2014

(65) Prior Publication Data

US 2015/0153921 A1    Jun. 4, 2015

Related U.S. Application Data

(63) Continuation of application No. PCT/CN2014/077569, filed on May 15, 2014.

(30) Foreign Application Priority Data

May 16, 2013  (CN) .......................... 2013 1 0181400

(51) Int. Cl.
*G06F 3/048* (2013.01)
*G06F 3/0486* (2013.01)
(Continued)

(52) U.S. Cl.
CPC .......... *G06F 3/0486* (2013.01); *G06F 9/4443* (2013.01); *G06F 9/4446* (2013.01); *G06F 17/30887* (2013.01)

(58) Field of Classification Search
CPC ........................... G06F 3/048–3/04886; G06F 17/30864–17/30902; G06F 2221/2151
See application file for complete search history.

(56) References Cited

U.S. PATENT DOCUMENTS

2002/0138653 A1   9/2002  Ogura
2005/0154994 A1*  7/2005  Chen ...................... G06F 9/543
                                                  715/770

(Continued)

FOREIGN PATENT DOCUMENTS

CN    102882963 A    1/2013

OTHER PUBLICATIONS

International Search Report dated Aug. 15, 2014 in International Application No. PCT/CN2014/077569.
(Continued)

*Primary Examiner* — Claudia Dragoescu
(74) *Attorney, Agent, or Firm* — Brinks Gilson & Lione

(57) ABSTRACT

An intelligent terminal may comprise at least one processor-readable non-transitory storage medium and at least one processor in communication with the at least one storage medium. The at least one storage medium may comprise at least one set of instructions for automatically pasting a URL from a clipboard to an address bar of a web browser. The at least one processor may be configured to execute the at least one set of instructions to obtain a URL copied by a user from a clipboard; determine an intention of the user associated with whether to paste the candidate string in a designated location of an interface displayed on the intelligent terminal; and automatically display the candidate string in the designated location of the interface when the intention of the user is determined to paste the candidate string in the designated location of the interface.

17 Claims, 5 Drawing Sheets

(51) Int. Cl.
    *G06F 17/30*         (2006.01)
    *G06F 9/44*           (2018.01)

(56) References Cited

U.S. PATENT DOCUMENTS

| | | | |
|---|---|---|---|
| 2009/0327915 A1* | 12/2009 | Holdaway | G06F 9/4443 |
| | | | 715/745 |
| 2014/0282118 A1* | 9/2014 | Kumamoto | G06F 3/0481 |
| | | | 715/760 |
| 2014/0324943 A1* | 10/2014 | Antipa | H04L 67/42 |
| | | | 709/203 |

OTHER PUBLICATIONS

Written Opinion dated Aug. 15, 2014 in International Application No. PCT/CN2014/077569.

* cited by examiner

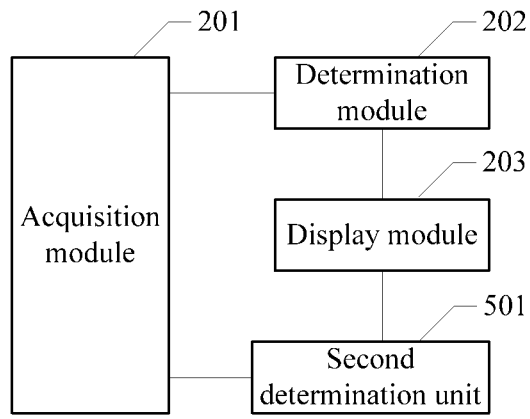
Figure 5-a
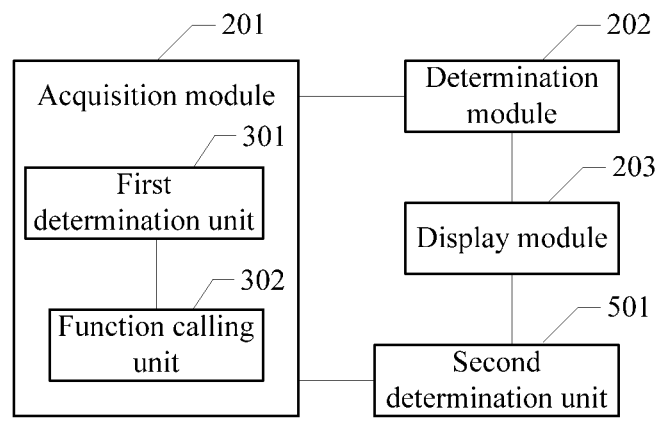
Figure 5-b
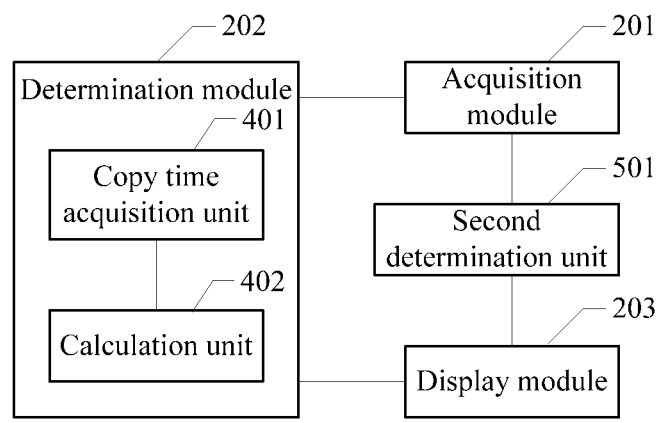
Figure 5-c

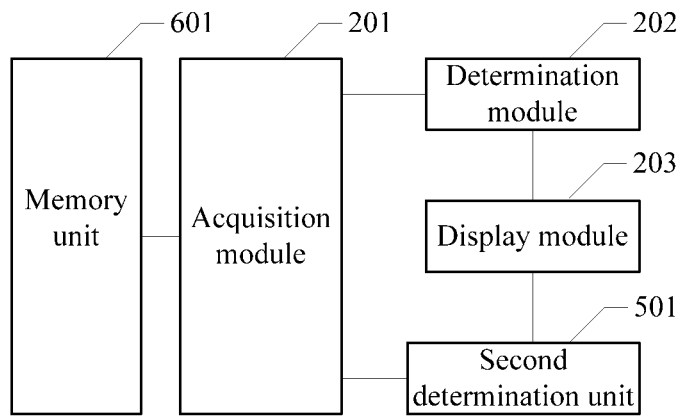
Figure 6-a
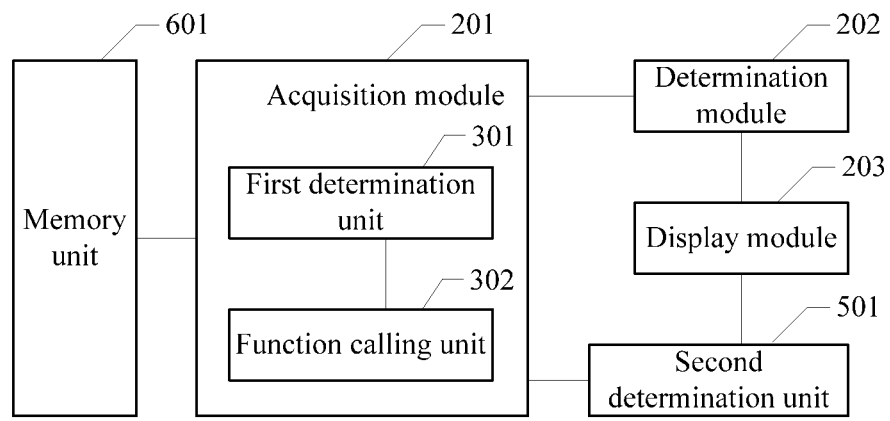
Figure 6-b
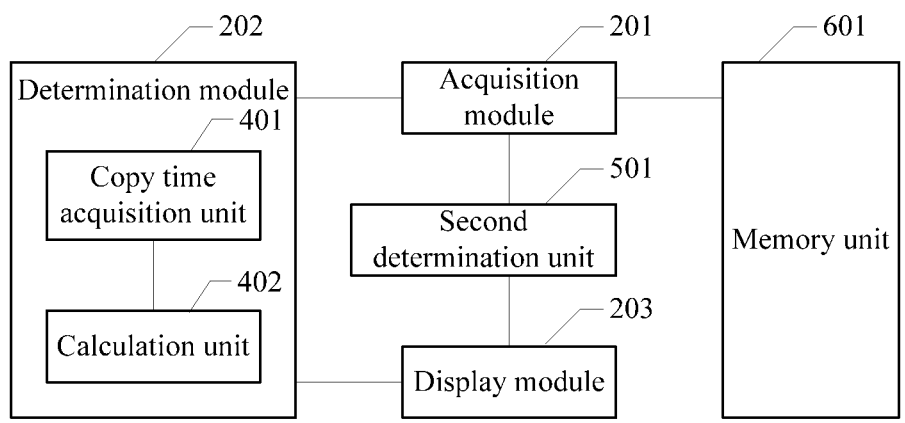
Figure 6-c

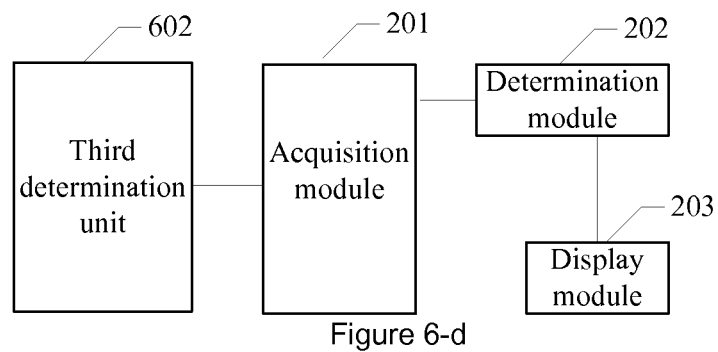
Figure 6-d
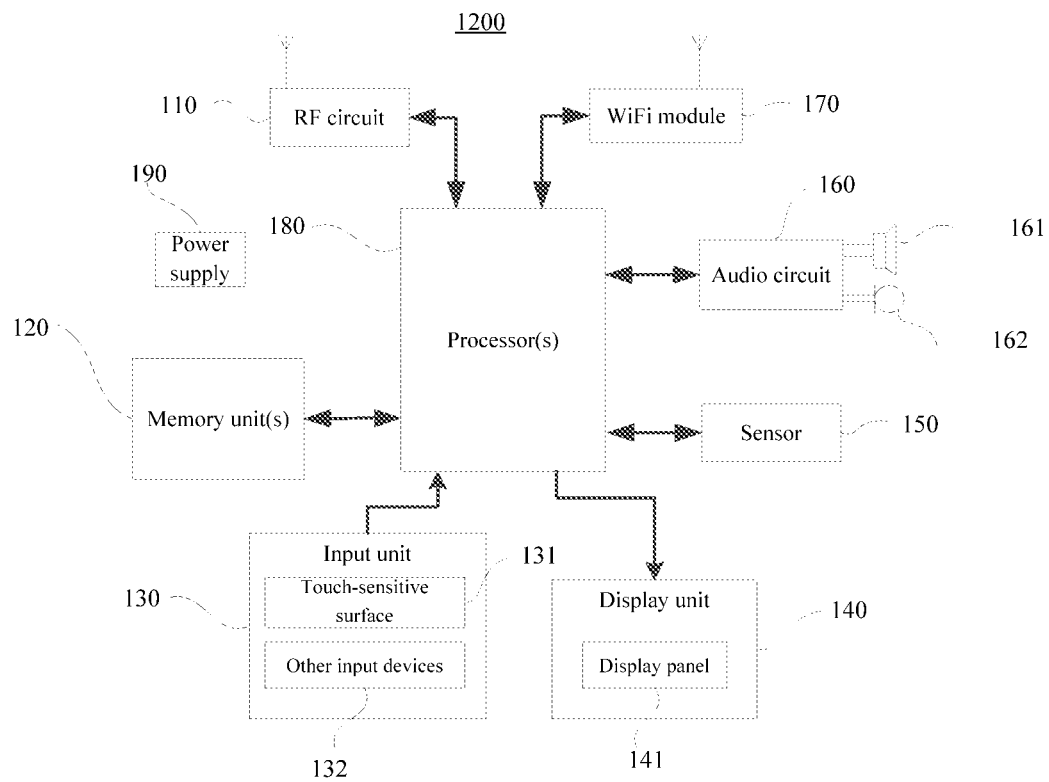
Figure 7

APPARATUSES AND METHODS FOR INPUTTING A UNIFORM RESOURCE LOCATOR

PRIORITY STATEMENT

This application is a continuation of International Application No. PCT/CN2014/077569, filed on May 15, 2014, in the State Intellectual Property Office of the People's Republic of China, which claims the priority benefit of Chinese Patent Application No. 201310181400.2, entitled "Apparatuses and Methods for Inputting a Uniform Resource Locator", filed on May 16, 2013, the disclosures of which are incorporated herein in their entirety by reference.

TECHNICAL FIELD

The present disclosure relates to the field of mobile communication, and in particular a method and an apparatus of inputting a URL.

BACKGROUND

A uniform resource locator (also known as Universal Resource Locator or URL), commonly known as a "web address," is similar to a house number on a network and is the address of a standard resource on the Internet. It was initially invented as a World Wide Web address, and now it has already been developed by the World Wide Web Consortium as Internet standard RFC1738. In the history of the Internet, the invention of the URL was a very fundamental step. The syntax of a URL is general and expandable, and it uses a part of an ASCII code to represent an Internet address. The beginning portion of a URL generally indicates a network protocol used by a computer network that the URL refers to.

When using a browser to browse a web page, a user generally inputs a URL in the web address bar and then arrives at the web page to be visited. There are generally two ways of inputting a URL. One is to input the URL characters one by one, and the other is to copy and paste the URL from somewhere outside of the web address bar of the browser, i.e. the URL characters are first copied, and then pasted in the web address bar.

With regard to a browser on an ordinary personal computer (i.e., PC), there is nothing wrong or inconvenient in using the aforementioned methods of inputting a URL. However, with regard to a browser on an intelligent terminal such as a cell phone, it is may be inconvenient for a user to first copy a URL, and then past the URL in the address bar of the browser.

SUMMARY

According to an aspect of the present disclosure, a method for automatically pasting a string from a clipboard to an interface of an intelligent terminal may comprise using at last one processor to conduct the following steps: obtaining a candidate string copied by a user from a clipboard of an intelligent terminal; determining an intention of the user associated with whether to paste the candidate string in a designated location of an interface displayed on the intelligent terminal; and displaying the candidate string in the designated location of the interface without receiving an instruction to paste from the user when the intention of the user is determined to paste the candidate string in the designated location of the interface.

According to an aspect of the present disclosure, an apparatus may comprise at least one processor-readable non-transitory storage medium and at least one processor in communication with the at least one storage medium. The at least one storage medium may comprise at least one set of instructions for automatically pasting a string from a clipboard to an interface of the apparatus. The at least one processor may be configured to execute the at least one set of instructions to obtain a candidate string copied by a user from a clipboard of an intelligent terminal; determining an intention of the user associated with whether to paste the candidate string in a designated location of an interface displayed on the intelligent terminal; and displaying the candidate string in the designated location of the interface without receiving an instruction to paste from the user when the intention of the user is determined to paste the candidate string in the designated location of the interface.

According to an aspect of the present disclosure, a processor-readable non-transitory storage medium may comprise at least one set of instructions for automatically pasting a string from a clipboard to an interface of an intelligent terminal. The at least one set of instructions, when executed by at least one processor, may direct the at least one processor to perform acts of obtaining a candidate string copied by a user from a clipboard of an intelligent terminal; determining an intention of the user associated with whether to paste the candidate string in a designated location of an interface displayed on the intelligent terminal; and displaying the candidate string in the designated location of the interface without receiving an instruction to paste from the user when the intention of the user is determined to paste the candidate string in the designated location of the interface.

BRIEF DESCRIPTION OF THE DRAWINGS

To better illustrate the technical solutions of the embodiments of the present disclosure, brief introduction to the drawings along with the description of the embodiments will be made below. It is obvious that the drawings in the following description are for illustrating exemplary embodiments of the present disclosure, and that a person of ordinary skilled in the art may derive additional drawings based on these figures without paying creative efforts.

FIG. 5-$a$ is a structural diagram of an apparatus of inputting a URL according to the example embodiments of the present disclosure;

FIG. 5-$b$ is a structural diagram of an apparatus of inputting a URL according to the example embodiments of the present disclosure;

FIG. 5-$c$ is a structural diagram of an apparatus of inputting a URL according to the example embodiments of the present disclosure;

FIG. 6-$a$ is a structural diagram of an apparatus of inputting a URL according to the example embodiments of the present disclosure;

FIG. 6-*b* is a structural diagram of an apparatus of inputting a URL according to the example embodiments of the present disclosure;

FIG. 6-*c* is a structural diagram of an apparatus of inputting a URL according to the example embodiments of the present disclosure;

FIG. 6-*d* is a structural diagram of an apparatus of inputting a URL according to the example embodiments of the present disclosure; and FIG. 7 is a structural diagram of an intelligent terminal according to the example embodiments of the present disclosure.

DETAILED DESCRIPTIONS

Figure 1:
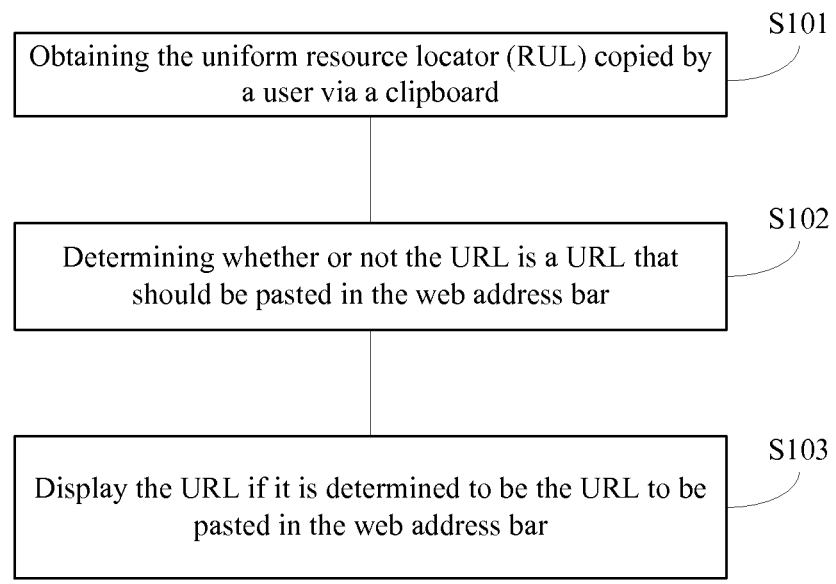
FIG. 1 is a process flow diagram of the method of inputting a URL according to example embodiments of the present disclosure.

Thus, example embodiments illustrated in FIGS. 1-8 serve only as examples to illustrate several ways of implementation of the present disclosure. They should not be construed as to limit the spirit and scope of the example embodiments of the present disclosure. It should be noted that those skilled in the art may still make various modifications or variations without departing from the spirit and scope of the example embodiments. Such modifications and variations shall fall within the protection scope of the example embodiments, as defined in attached claims FIG. 7 illustrates a structural diagram of an intelligent terminal according to the example embodiments of the present disclosure. The intelligent terminal may be implemented as systems and/or to operate methods disclosed in the present disclosure.

The intelligent terminal 1200 may include an RF (Radio Frequency) circuit 110, one or more than one memory unit(s) 120 of computer-readable memory media, an input unit 130, a display unit 140, a sensor 150, an audio circuit 160, a WiFi (wireless fidelity) module 170, at least one processor 180, and a power supply 190. Those of ordinary skill in the art may understand that the structure of the intelligent terminal shown in FIG. 9 does not constitute restrictions on the intelligent terminal. Compared with what is shown in the figure, more or fewer components may be included, or certain components may be combined, or components may be arranged differently.

The RF circuit 110 may be configured to receive and transmit signals during the course of receiving and transmitting information and/or phone conversation. Specifically, after the RF circuit 110 receives downlink information from a base station, it may hand off the downlink information to the processor 180 for processing. Additionally, the RF circuit 110 may transmit uplink data to the base station. Generally, the RF circuit 110 may include, but is not limited to, an antenna, at least one amplifier, a tuner, one or multiple oscillators, a subscriber identification module (SIM) card, a transceiver, a coupler, an LNA (Low Noise Amplifier), and a duplexer. The RF circuit 110 may also communicate with a network and/or other devices via wireless communication. The wireless communication may use any communication standards or protocols available or one of ordinary skill in the art may perceive at the time of the present disclosure. For example, the wireless communication may include, but not limited to, GSM (Global System of Mobile communication), GPRS (General Packet Radio Service), CDMA (Code Division Multiple Access), WCDMA (Wideband Code Division Multiple Access), LTE (Long Term Evolution), email, and SMS (Short Messaging Service).

The memory unit 120 may be configured to store software programs and/or modules. The software programs and/or modules may be sets of instructions to be executed by the processor 180. The processor 180 may execute various functional applications and data processing by running the software programs and modules stored in the memory unit 120. The memory unit 120 may include a program memory area and a data memory area, wherein the program memory area may store the operating system and at least one functionally required application program (such as the audio playback function and image playback function); the data memory area may store data (such as audio data and phone book) created according to the use of the intelligent terminal 1200. Moreover, the memory unit 120 may include high-speed random-access memory and may further include non-volatile memory, such as at least one disk memory device, flash device, or other volatile solid-state memory devices. Accordingly, the memory unit 120 may further include a memory controller to provide the processor 180 and the input unit 130 with access to the memory unit 120.

The input unit 130 may be configured to receive information, such as numbers or characters, and create input of signals from keyboards, touch screens, mice, joysticks, optical or track balls, which are related to user configuration and function control. Specifically, the input unit 130 may include a touch-sensitive surface 131 and other input devices 132. The touch-sensitive surface 131, also called a touch screen or a touch pad, may collect touch operations by a user on or close to it (e.g., touch operations on the touch-sensitive surface 131 or close to the touch-sensitive surface 131 by the user using a finger, a stylus, and/or any other appropriate object or attachment) and drive corresponding connecting devices according to preset programs. The touch-sensitive surface 131 may include two portions, a touch detection device and a touch controller. The touch detection device may be configured to detect the touch location by the user and detect the signal brought by the touch operation, and then transmit the signal to the touch controller. The touch controller may be configured to receive the touch information from the touch detection device, convert the touch information into touch point coordinates information of the place where the touch screen is contacted, and then send the touch point coordinates information to the processor 180. The touch controller may also receive commands sent by the processor 180 for execution. Moreover, the touch-sensitive surface 131 may be realized by adopting multiple types touch-sensitive surfaces, such as resistive, capacitive, infra-red, and/or surface acoustic sound wave surfaces. Besides the touch-sensitive surface 131, the input unit 130 may further include other input devices 132, such as the input devices 132 may also include, but not limited to, one or multiple types of physical keyboards, functional keys (for example, volume control buttons and switch buttons), trackballs, mice, and/or joysticks.

The display unit 140 may be configured to display information input by the user, provided to the user, and various graphical user interfaces on the intelligent terminal 1200. These graphical user interfaces may be composed of graphics, texts, icons, videos, and/or combinations thereof. The display unit 140 may include a display panel 141. The display panel 141 may be in a form of an LCD (Liquid Crystal Display), an OLED (Organic Light-Emitting Diode), or any other form available at the time of the present disclosure or one of ordinary skill in the art would have perceived a the time of the present disclosure. Furthermore, the touch-sensitive surface 131 may cover the display panel 141. After the touch-sensitive surface 131 detects touch operations on it or nearby, it may transmit signals of the touch operations to the processor 180 to determine the type of the touch event. Afterwards, according to the type of the touch event, the processor 180 may provide corresponding visual output on the display panel 141. In FIG. 11 the touch-sensitive surface 131 and the display panel 141 realize the input and input functions as two independent components. Alternatively, the touch-sensitive surface 131 and the display panel 141 may be integrated to realize the input and output functions.

The intelligent terminal 1200 may further include at least one type of sensor 150, for example, an optical sensor, a motion sensor, and other sensors. An optical sensor may include an environmental optical sensor and a proximity sensor, wherein the environmental optical sensor may adjust the brightness of the display panel 141 according to the brightness of the environment, and the proximity sensor may turn off the display panel 141 and/or back light when the intelligent terminal 1200 is moved close an ear of the user. As a type of motion sensor, a gravity acceleration sensor may detect the magnitude of acceleration in various directions (normally three axes) and may detect the magnitude of gravity and direction when it is stationary. The gravity acceleration sensor may be used in applications of recognizing the attitude of the intelligent terminal 1200 (e.g., switching screen orientation, related games, and magnetometer calibration) and functions related to vibration recognition (e.g., pedometers and tapping); the intelligent terminal 1200 may also be configured with a gyroscope, barometer, hygrometer, thermometer, infrared sensor, and other sensors.

An audio circuit 160, a speaker 161, and a microphone 162 may provide audio interfaces between the user and the intelligent terminal 1200. The audio circuit 160 may transmit the electric signals, which are converted from the received audio data, to the speaker 161, and the speaker 161 may convert them into the output of sound signals; on the other hand, the microphone 162 may convert the collected sound signals into electric signals, which may be converted into audio data after they are received by the audio circuit 160; after the audio data is output to the processor 180 for processing, it may be transmitted via the RF circuit 110 to, for example, another terminal; or the audio data may be output to the memory unit 120 for further processing. The audio circuit 160 may further include an earplug jack to provide communication between earplugs and the intelligent terminal 1200.

WiFi is a short-distance wireless transmission technology. Via the WiFi module 170, the intelligent terminal 1200 may help users receive and send emails, browse web pages, and visit streaming media. The WiFi module 170 may provide the user with wireless broadband Internet access.

The processor 180 may be the control center of the intelligent terminal 1200. The processor 180 may connect to various parts of the entire intelligent terminal 1200 utilizing various interfaces and circuits. 180 may conduct overall monitoring of the intelligent terminal 1200 by running or executing the software programs and/or modules stored in the memory unit 120, calling the data stored in the memory unit 120, and executing various functions and processing data of the intelligent terminal 1200. The processor 180 may include one or multiple processing core(s). The processor 180 may integrate an application processor and a modem processor, wherein the application processor may process the operating system, user interface, and application programs, and the modem processor may process wireless communication.

Merely for illustration, in the present disclosure only one processor 180 is described in the intelligent terminal 1200 to execute operations and/or method steps in the following example embodiments. However, it should be note that the intelligent terminal 1200 in the present disclosure may include multiple processors, thus operations and/or method steps that are performed by one processor as described in the present disclosure may also be jointly or separately performed by the multiple processors. For example, if in the present disclosure a processor of the intelligent terminal 1200 both step A and step B, it should be understood that step A and step B may also be performed by two different processors jointly or separately in the intelligent terminal 1200 (e.g., the first processor executes step A and the second processor executes step B, or the first and second processors jointly execute steps A and B).

The intelligent terminal 1200 may further include a power supply 190 (for example a battery), which supplies power to various components. The power supply may be logically connected to the processor 180 via a power management system so that charging, discharging, power consumption management, and other functions may be realized via the power management system. The power supply 190 may further include one or more than one DC or AC power supply, a recharging system, a power failure detection circuit, a power converter or inverter, a power status indicator, and other random components.

For the purpose of illustrating the spirit of the invention only, the intelligent terminal 1200 disclosed in the below example embodiments includes a touch screen display unit, a memory unit, and one or more than one program(s), wherein the one or more than one program(s) is/are stored in the memory unit.

FIG. 1 is a process flow diagram of a method of inputting a URL as disclosed by an embodiment of the present disclosure. The present embodiment may be mainly illustrated by the application of such method of inputting a URL in an intelligent terminal containing a touch screen or touch pad, such as the intelligent terminal 1200 in FIG. 7. However, it should be understood by one of ordinary skill in the art that the same method and technology can also be implemented to input a string in a designated location on an interface of the intelligent terminal. Also, the intelligent terminals may include smart phones, tablet computers, electronic readers, MP3 players (Moving Picture Experts Group Audio Layer III), MP4 (Moving Picture Experts Group Audio Layer IV) players, laptop computers, and desktop computers. The method of inputting a URL, as illustrated in FIG. 1, may include the following steps:

In step S101, the intelligent terminal may obtain the URL copied by the user via the clipboard.

The intelligent terminal may obtain the URL copied by the user via the clipboard when the intelligent terminal opens a page of a web browser, or when the intelligent terminal opens other application such as a short message. According to the example embodiments of the present disclosure, a user may operate the intelligent terminal to copy a URL to the clipboard, which may be similar to the technical solution of copying ordinary text or characters to the clipboard. The difference may be that since the text or characters on the clipboard is/are the text or characters to be pasted in the web address bar, when a URL copied by a user is obtained via the clipboard, intelligent terminal may first determine whether or not the string obtained from the clipboard is a URL. To this end, the intelligent terminal may examine whether or not the string obtained from the clipboard is of the URL format. For example, intelligent terminal may examine whether or not the string obtained from the clipboard begins with "http://". If the string obtained from the clipboard begins with http://, then intelligent terminal may further confirm whether or not the string has a domain name separator "." after http://. If yes, intelligent terminal may determine that the string obtained from the clipboard is a URL. For example, intelligent terminal will determine that a string "http://3g.qq.com" is a URL, rather than ordinary text or a string. After the intelligent terminal determines that the string obtained from the clipboard is a URL, it may call an API (Application Programming Interface) function to obtain the URL from the clipboard. For example, in the IOS system the API function may be called to obtain the URL from the clipboard as follows: NSString* str=[UIPasteboard generalPasteboard].string. In the aforementioned API calling, the content of the variable str may be the URL copied by the user.

Before obtaining the URL copied by the user via the clipboard, the intelligent terminal may further determine whether or not a web address bar on the page of the web browser is not occupied (i.e., whether the web address bar is empty or having a string that is not a URL pasted therein). If the address bar is not occupied, the intelligent terminal may conduct the acquisition of the URL, i.e., the intelligent terminal may obtain the URL copied by the user via the clipboard; if the address bar is occupied (i.e., there is a URL pasted in the web address bar), the intelligent terminal may terminate the action to obtain the URL via the clipboard. In the example embodiments of the present disclosure, to determine whether or not the web address bar is occupied may be based on whether or not the web address bar contains a web address. If there is no web address in the address bar, the intelligent terminal may determine that the web address bar is not occupied; otherwise, the intelligent terminal may determine that the web address bar is occupied.

In step S102, the intelligent terminal may determine whether or not the URL is a URL that should be pasted in the web address bar.

To this end, the intelligent terminal may determine that the action of copying the URL to the clipboard and the subsequent opening or visiting the web browser page by the user is a series of related actions conducted by the user who is operating the intelligent terminal so that his/her intention would be to past the URL in the web address bar of the web browser page in a next action. By first making this determination, the intelligent terminal may then determine whether or not the URL in the clipboard is the URL that should be pasted in the web address bar. To determine whether the copying and opening or visiting is a series of related actions, the intelligent terminal may compare whether a time interval between the two actions is shorter than a preset reference time t. The preset reference time t may be short enough so that it is sufficient to determine whether the copying and pasting operations by the user may be a series of related actions. For example, the preset reference time t may be 30 seconds. Further, to determine whether or not the URL the user just copied is the URL that may be pasted in the web address bar, the intelligent terminal may first obtain the time t1 at which the URL was copied, and to calculate the time difference $\Delta t$ between the current time t0 and the time t1 at which the URL may be copied, i.e. at $\Delta t=t0-t1$. The intelligent terminal then may compare the difference $\Delta t$ with the preset reference time t. If the difference $\Delta t$ is less than the preset reference time t, the intelligent terminal may determine that the URL is the URL to paste in the web address bar.

In order to avoid duplicate pasting of the URL in the web address bar, the intelligent terminal may search an auto-paste record and determine whether or not the URL has been saved in the auto-paste record. In the example embodiments of the present disclosure, the auto-paste record may store the URLs that have already been pasted in the web address bar earlier (i.e., a list of URLs that are historically pasted in the web address bar). If by searching the auto-paste record, the aforementioned URL obtained via the clipboard has not been saved therein, the intelligent terminal may paste the URL obtained via the clipboard in the web address bar.

In step S103, the intelligent terminal may paste the URL after determining that the URL obtained via the clipboard is a URL to be pasted in the web address bar. The processor may conduct this step automatically without receiving a pasting operation instruction and/or command from the user.

Accordingly, in the present disclosure, after obtaining the URL copied by the user and determining that the URL should be pasted in the web address bar, a pasting operation by the user is not required. The intelligent terminal may automatically paste the URL in the web address bar by calling the API function provided by the system. Specifically, since the web address bar may be an input control provided by the system, such input control may provide an API to configure the content it displays. To use such API, the intelligent terminal may set the URL obtained via the clipboard as the content to display in the address bar. For example, in IOS where the web address bar is UITextField and setText(NSString* s) is an API method to set the content to display in the address bar; the intelligent terminal may be able to automatically paste the URL obtained via the clipboard in the web address bar by calling the setText(NSString* s) method of UITextField. In the aforementioned API function setText( ), the auto-paste address may be imported in the parentheses.

In order to ensure that the aforementioned URL displayed in the web address bar will not be displayed in the web address bar again when a web browser page is opened next time, according to the example embodiments of the present disclosure, after the URL obtained via the clipboard is displayed in the web address bar, a copy of the URL displayed in the web address bar may be further saved in the auto-paste record.

Accordingly, the URL obtained via the clipboard may be displayed in the web address bar with no requirement for a pasting action from the user. Further, after the URL is displayed in the web address bar, the processor may further execute the web browser and open the web page where the URL directs to, so that all the user needs to do is to copy the URL and open or visit a web browser page in order to visit the web page of the URL.

Figure 2:
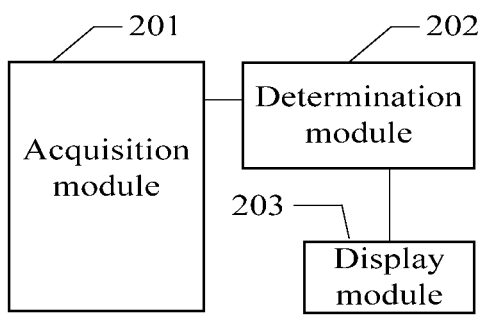
FIG. 2 is a structural diagram of an apparatus of inputting a URL according to example embodiments of the present disclosure.

FIG. 2 is a structural diagram of an apparatus of inputting a URL according to the example embodiments of the present disclosure. For the ease of illustration, only the portion related to the example embodiments of the present disclosure are shown. The apparatus may be an intelligent terminal having a certain functional module, unit and/or software program therein. These functional module, unit, and/or software program may be executed by one or more processors of the apparatus.

The apparatus may include an acquisition module 201, a determination module 202, and a display module 203. The acquisition module 201 may be configured to obtain the URL copied by the user via the clipboard. The determination module 202 may be configured to determine whether or not the URL is the one to be pasted in the web address bar. The display module 203 may be configured to display the URL obtained via the clipboard in the web address bar if the determination module 202 determines that the URL is the one to be pasted in the web address bar. After a series of actions, such as obtaining the URL copied by the user and determining that the URL is to be pasted in the web address bar, the execution of the pasting operation by the user may not be needed. Rather, the URL obtained via the clipboard may be displayed by the display module 203 in the web address bar. For example, the display module 203 may automatically paste the URL obtained via the clipboard in the web address bar by calling the API provided by the apparatus. When the web address bar is an input control that provides an API to determine the content it displays, the API may simply set the URL obtained via the clipboard as its content to display. For example, in the IOS, the web address bar of a web browser may be UITextField and setText (NSString* s) may be an API method to configure the content to display in the address bar. By calling the setText (NSString* s) method of UITextField, the apparatus may auto-paste the URL obtained via the clipboard in the web address bar. In the aforementioned API function setText( ), the auto-paste address may be imported in the parentheses.

In the apparatus of inputting a URL, the division of various functional modules is for illustration only. In actual application, based on the requirements, for example the corresponding configuration requirement for hardware or the convenience consideration of software realization, the aforementioned functions may be distributed to different functional modules for completion, i.e., the internal structure of the apparatus of inputting a URL may be divided into different functional modules to complete all or some of the functions described above. Moreover, in actual application, the corresponding functional modules in the present embodiment may be realized by corresponding hardware and may also be completed by the execution of corresponding software by corresponding hardware. For example, the aforementioned determination module 202 may be a piece of hardware, such as a determiner, being configured to execute the aforementioned determination whether or not the URL in the clipboard may be the URL to be pasted in the web address bar. The determination module 202 may also be a processor or other hardware device configured to execute corresponding computer programs to complete the aforementioned functions. Another example may be that the aforementioned display module may be a piece of hardware, such as a monitor, configured to execute the aforementioned function of displaying the URL obtained via the clipboard in the web address bar if the determination module (or determiner) determines that the URL is the one to be pasted in the web address bar. The display module 203 may also be a processor or other hardware device configured to execute corresponding computer programs to complete the aforementioned functions (the principle described above may be applied in all example embodiments disclosed in the present disclosure).

Figure 3:
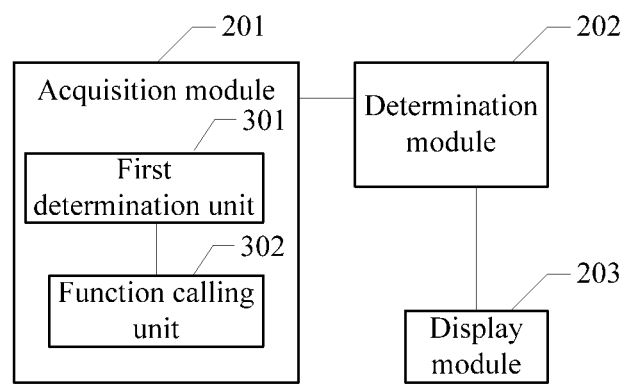
FIG. 3 is a structural diagram of an apparatus of inputting a URL according to the example embodiments of the present disclosure.

FIG. 3 is a structural diagram of an apparatus of inputting a URL according to the example embodiments of the present disclosure. In addition to all the elements shown in FIG. 2, the acquisition module 201 in FIG. 3 may further include a first determination unit 301 and a function calling unit 302.

The first determination unit 301 may be configured to determine whether or not the string obtained from the clipboard is a URL, and the function calling unit 302 may be configured to obtain the URL from the clipboard by calling the API function if the first determination unit 301 determines that the string obtained from the clipboard is a URL. In the apparatus as illustrated in FIG. 3, whether or not the string obtained from the clipboard is a URL may be determined by examining whether or not the string obtained from the clipboard has a URL format. For example, the first determination unit 301 may examine whether or not the string obtained from the clipboard begins with "http://". If the string obtained from the clipboard begins with "http://", the first determination unit 301 may further confirm whether or not the string has a domain name separator "." after "http://". If yes, the first determination unit 301 may determine that the string obtained from the clipboard is a URL. For example, the first determination unit 301 may determine that the string "http://3g.qq.com" is a URL, rather than an ordinary text or string. After the first determination unit 301 determines that the string obtained from the clipboard may be a URL, the function calling unit 302 may call the API function to obtain the URL from the clipboard. For example, in the IOS system, the function calling unit 302 may call the API function to obtain the URL from the clipboard as follows: NSString* str 32 [UIPasteboard generalPasteboard].string. In the aforementioned API calling, the content of the variable str may be the URL copied by the user.

In order to accurately determine that the copying action and a subsequent action of opening or visiting a page of the web browser are a series of related actions and thereby to determine whether or not the URL copied to the clipboard is a URL to be pasted in the web address bar of the opened web browser page, the apparatus may preset a reference time t. The preset reference time t may be short enough to determine whether the copying and opening or visiting operations by the user are a series of related actions. For example, the preset reference time t may be 30 second.

Figure 4:
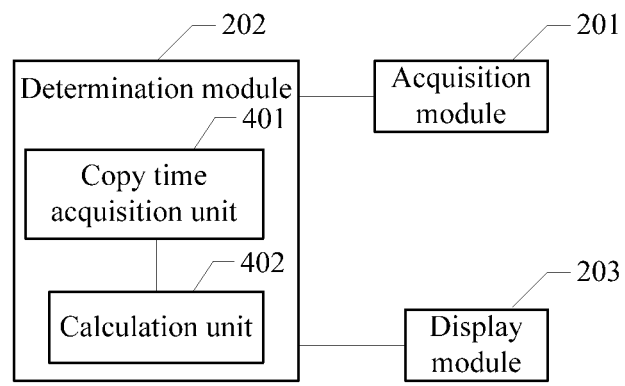
FIG. 4 is a structural diagram of an apparatus of inputting a URL according to the example embodiments of the present disclosure.

FIG. 4 is a structural diagram of an apparatus of inputting a URL according to the example embodiments of the present disclosure. In addition to all the elements shown in FIG. 2, the determination module 202 in FIG. 4 may include a copy time acquisition unit 401 and a calculation unit 402.

The copy time acquisition unit 401 may be configured to obtain the time t1 at which the URL was copied, and the calculation unit 402 may be configured to calculate the difference $\Delta t$ between the current time t0 and the time t1, i.e. $\Delta t = t0 - t1$. If the difference $\Delta t$ is less than the preset reference time t, the apparatus may determine that the URL is the URL to be pasted in the web address bar.

The apparatuses of inputting a URL as illustrated in any one of FIG. 2 through FIG. 4 above further includes, the apparatuses may further include a second determination unit 501. Corresponding apparatuses are shown in FIG. 5-a, FIG. 5-b, and FIG. 5-c. Specifically, the apparatus that corresponds to FIG. 2 is shown in FIG. 5-a; the apparatus that corresponds to FIG. 3 is shown in FIG. 5-b; and the apparatus corresponds to FIG. 4 is shown in FIG. 5-c.

The second determination unit 501 may be configured to search an auto-paste record and determine whether or not the URL to be pasted in the web address bar is saved in the auto-paste record, wherein the auto-paste record is a list saving the URLs that was previously pasted in the web address bar. The number of URLs saved in the auto-paste record may have a limited number. For example, only the previous 12 URLs may be saved in the auto-paste record, so that the user may be able to re-visit the same website without having to paste the URL by himself/herself after he/she has navigate away from the website and rendered the apparatus paste 12 other URLs in the auto-paste record. The number of URLs saved in the auto-paste record may also depend on the time when the URLs are pasted. For example, only URLs that are pasted within 30 minutes are saved in the auto-paste record, so that if the user of the apparatus wishes to visit a website that he/she visited 3 days ago and accordingly copy the URL of the website, the URL may be pasted on a subsequent blank page that the user opens.

If the second determination unit 501 determines that the URL that the user just copied to the clipboard is not in the auto-paste record, the apparatus may paste and display the URL obtained in the web address bar.

The apparatuses for inputting a URL as illustrated in FIG. 5-*a*, FIG. 5-*b*, and FIG. 5-*c* above may further include, the apparatuses may further include a memory unit 601, as shown in FIG. 6-*a*, FIG. 6-*b*, and FIG. 6-*c*, respectively. The memory unit 601 may be configured to store the auto-paste record, and thereby ensuring that the aforementioned URL displayed in the web address bar will not be pasted again when the web address bar is opened next time.

FIG. 6-*d* is a structural diagram of an apparatus of inputting a URL according to the example embodiments of the present disclosure. In addition to all the elements shown in FIG. 2, The apparatus in FIG. 6-*d* may further include a third determination unit 602. The third determination unit 601 may be configured to determine, when the user go to a page (e.g., a newly opened blank page or a page that has been opened before) of the web browser after copying a URL to the clipboard, whether or not the web address bar of the page is occupied. If the third determination unit 601 determines that the web address bar is not occupied, the acquisition module 201 may obtain the URL copied by the user via the clipboard. For example, the third determination unit 601 may determine whether or not the web address bar is occupied based on whether or not the web address bar contains a web address. If there is no web address in the web address bar, the third determination unit 601 may determine that the web address bar is not occupied; otherwise, the third determination unit 601 may determine that the web address bar may be occupied.

Referring back to FIG. 7. The intelligent terminal 1200 may further include a camera and a Bluetooth module (not shown). The intelligent terminal 1200 may be implemented to execute the above disclosed methods for inputting a URL. According to the example embodiments of the present disclosure, the memory unit 120 may include and/or store one or more than one program(s), which include sets of commands and/or instructions configured to be executed by the processor 180 and instruct the processor 180 to perform the following operations: obtaining the URL copied by the user via the clipboard; determining whether or not the URL is the one to be pasted in the web address bar; and if yes, displaying the URL obtained via the clipboard in the web address bar.

The commands and/or instructions stored in the memory unit 120 of the intelligent terminal 1200 may be further configured to instruct the processor 180 to perform the following operations: determining whether or not the string obtained from the clipboard is the URL; if yes, the URL may be obtained from the clipboard by calling the API function.

The command and/or instructions stored in the memory unit 120 of the intelligent terminal 1200 may further be configured to instruct the processor 180 to perform the following operations: obtaining the time at which the URL is copied; calculating the difference between current time and the time of copying the URL; if the difference is less than the preset time, the processor 180 may determine that the URL is the one to be pasted in the web address bar.

The command and/or instructions stored in the memory unit 120 of the intelligent terminal 1200 may further be configured to instruct the processor 180 to perform the following operations: searching the auto-paste record; determining whether or not the URL that will be pasted in the web address bar is stored in the auto-paste record; and if not, displaying the URL obtained via the clipboard in the web address bar.

The command and/or instructions stored in the memory unit 120 of the intelligent terminal 1200 may further be configured to instruct the processor 180 to perform the following operations: storing a copy of the URL displayed in the web address bar in the auto-paste record.

The command and/or instructions stored in the memory unit 120 of the intelligent terminal 1200 may further be configured to instruct the processor 180 to perform the following operations: determining whether or not the web address bar is occupied; and if it is not occupied, obtaining the URL copied by the user via the clipboard.

The intelligent terminal 1200 may further include a camera and a Bluetooth module (not shown). Specifically, the display unit 140 of the terminal may be a touch screen. The terminal further may include a memory unit 120, and one or more than one program(s), wherein the one or more than one program(s) may be stored in the memory unit 120. The processor 180 may execute the one or more than one program(s), which include commands configured to instruct the processor 180 to perform the following operations: acquiring the URL copied by the user via the clipboard; determining whether or not the URL is the one to be pasted in the web address bar; if yes, displaying the URL obtained via the clipboard in the web address bar.

According to the example embodiments of the present disclosure, there is also provided a computer-readable memory medium. The computer-readable memory medium may be the computer-readable memory medium contained in the memory unit 120 in the aforementioned intelligent terminal 1200. Alternatively, the computer-readable memory medium may also be an independent computer-readable memory medium, which may be external to the intelligent terminal 1200. The computer-readable memory medium may include one or more programs. The one or more programs, if executed by one or more processors, may direct the one or more processors to execute a slide control method.

The method may include the following steps: obtaining the URL copied by the user via the clipboard; determining whether or not the URL is the URL to be pasted in the web address bar; and if yes, displaying the URL obtained via the clipboard in the web address bar.

The obtaining of the URL copied by the user via the clipboard may include: determining whether or not the string obtained from the clipboard is a URL; if yes, the URL may be obtained from the clipboard by calling the application programming interface function.

The determining whether or not the URL may be the URL to be pasted in the web address bar may include: obtaining the time at which the URL was copied; calculating the difference between current time and the time of copying the URL; if the difference is less than the preset time, the URL may be the URL to be pasted in the web address bar.

Additionally, the method may further include: searching the auto-paste record; determining whether or not the URL to be pasted in the web address bar is stored in the auto-paste record; and if not, displaying the URL obtained via the clipboard in the web address bar.

The method may further include: storing a copy of the URL displayed in the web address bar in the auto-paste record.

The method may further include: determining whether or not the web address bar is occupied and if it is not occupied, obtaining the URL copied by the user via the clipboard and displaying it in the web address bar.

The interactions and execution processes among various modules/units of the aforementioned apparatus may be based on the same concept as the example embodiments of the methods in the present disclosure and the technical effects they bring forth may be the same as those of the example embodiments of the methods in the present disclosure. Those of ordinary skill in the art may understand that all or some of the steps in the various methods in the aforementioned embodiments may be completed through hardware or alternatively via programs, i.e., by executing the programs by corresponding hardware. Such programs may be stored in a computer-readable memory medium. The memory medium may include: Read Only Memory (ROM), Random Access Memory (RAM), a disk or CD.

While example embodiments of the present disclosure relate to apparatus and methods for inputting URL in a web address bar on an intelligent terminal, the apparatus and methods may also be applied to other Applications. For example, in addition to an web address bar of a web browser, the methods and apparatuses may also be applied to other portion of the web browser, such as a dialog box on a web page of the web browser where the user may need to input certain information. Additionally, while example embodiments of the present disclosure relate to apparatus and methods for inputting URL in a web browser, the same methods and apparatuses may be implemented to other interface or interface of software of the intelligent terminal. For example, the methods and apparatus may be implemented in an office software where copy and paste actions are frequently used. The present disclosure intends to cover the broadest scope of apparatuses and methods for content pasting.

Thus, example embodiments illustrated in FIGS. 1-7 serve only as examples to illustrate several ways of implementation of the present disclosure. They should not be construed as to limit the spirit and scope of the example embodiments of the present disclosure. It should be noted that those skilled in the art may still make various modifications or variations without departing from the spirit and scope of the example embodiments. Such modifications and variations shall fall within the protection scope of the example embodiments, as defined in attached claims.

What is claimed is:

1. A method for automatically pasting a string from a clipboard to an interface of an intelligent terminal, comprising:
    obtaining, by a processor, a candidate string copied by a user from a clipboard of an intelligent terminal;
    obtaining, by the processor, a first time, wherein the first time is a time when the candidate string was copied to the clipboard;
    obtaining, by the processor, a second time, wherein the second time is a time when the user visited the interface subsequent to the first time;
    calculating, by the processor, a time difference between the first time and the second time;
    determining, by the processor, whether the time difference is less than a preset reference time;
    when it is determined that the time difference is less than a preset reference time, indicating, by the processor, that an intention of the user is to paste the candidate string in a designated location of an interface displayed on the intelligent terminal;
    searching, by a processor, an auto-paste record and determining whether the candidate string is in the auto-paste record; and
    displaying, by a processor, the candidate string in the designated location of the interface without receiving an instruction to paste from the user when the intention of the user is indicated to paste the candidate string in the designated location of the interface and when the candidate string is not in the auto-paste record.

2. The method according to claim 1, wherein:
    the interface is a web browsing page;
    the designated location is a web address bar on the web browsing page; and
    the obtaining of the candidate string comprises:
        determining whether the candidate string is a Uniform Resources Location (URL); and
        obtaining the URL from the clipboard by calling an application programming interface function.

3. The method according to claim 1, wherein the auto-paste record is a list of strings that were historically displayed in the designated location of the interface.

4. The method according to claim 3, further comprising:
    storing a copy of the candidate string in the auto-paste record when the candidate string is displayed in the designated location of the interface.

5. The method according to claim 1, wherein:
    the designated location of the interface requires a predetermined format for a string to be displayed therein; and
    the displaying the candidate string in the designated location of the interface without receiving the instruction to paste from the user when the intention of the user is indicated to paste the candidate string in the designated location of the interface and when the candidate string is not in the auto-paste record further comprises:
        displaying the candidate string when the designated location of the interface is empty or when a preexisting string in the designated location of the interface does not conform with the predetermined format.

6. The method according to claim 1, wherein:
    the candidate string is copied from a source other than the interface; and
    the displaying the candidate string in the designated location of the interface without receiving the instruction to paste from the user when the intention of the user is indicated to paste the candidate string in the designated location of the interface and when the candidate string is not in the auto-paste record occurs when the user leaves the source and visits the interface.

7. An apparatus, comprising:
    at least one storage medium storing at least one set of instructions for automatically pasting a candidate string from a clipboard to an interface displayed on the apparatus; and
    at least one processor in communication with the at least one storage medium, wherein, when the at least one processor executes the at least one set of instructions, the at least one processor is configured to:
        obtain the candidate string copied by a user from the clipboard of the apparatus;
        obtain a first time, wherein the first time is a time when the candidate string was copied to the clipboard;
        obtain a second time, wherein the second time is a time when the user visited the interface subsequent to the first time;
        calculate a time difference between the first time and the second time;
        determine whether the time difference is less than a preset reference time;
        when it is determined that the time difference is less than a preset reference time, indicate that an intention of the user is to paste the candidate string in a designated location of the interface displayed on the apparatus;

search an auto-paste record and determine whether the candidate string is in the auto-paste record; and display the candidate string in the designated location of the interface without receiving an instruction to paste from the user when the intention of the user is indicated to paste the candidate string in the designated location of the interface and when the candidate string is not in the auto-paste record.

8. The apparatus according to claim 7, wherein:
the interface is a web browsing page;
the designated location is a web address bar on the web browsing page; and
to obtain the candidate string, when the at least one processor executes the at least one set of instructions, the at least one processor is further configured to:
determine whether the candidate string is a Uniform Resources Location (URL); and
obtain the URL from the clipboard by calling an application programming interface function.

9. The apparatus according to claim 7, wherein the auto-paste record is a list of strings that were historically displayed in the designated location of the interface.

10. The apparatus according to claim 7, wherein, when the at least one processor executes the at least one set of instructions, the at least one processor is further configured to:
save a copy of the candidate string in the auto-paste record when the candidate string is displayed in the designated location of the interface.

11. The apparatus according to claim 7, wherein:
the designated location of the interface requires a predetermined format for a string to be displayed therein; and
when the at least one processor is configured to display the candidate string in the designated location of the interface without receiving the instruction to paste from the user when the intention of the user is indicated to paste the candidate string in the designated location of the interface and when the candidate string is not in the auto-paste record, the at least one processor is further configured to:
display the candidate string when the designated location of the interface is empty or when a preexisting string in the designated location of the interface does not conform with the predetermined format.

12. The apparatus according to claim 7, wherein:
the candidate string is copied from a source other than the interface; and
when the at least one processor is configured to display the candidate string in the designated location of the interface without receiving the instruction to paste from the user when the intention of the user is indicated to paste the candidate string in the designated location of the interface and when the candidate string is not in the auto-paste record, the at least one processor is configured to:
display the candidate string in the designated location of the interface without receiving the instruction to paste from the user when the intention of the user is indicated to paste the candidate string in the designated location of the interface, when the candidate string is not in the auto-paste record, and when the user leaves the source and visits the interface.

13. A processor-readable non-transitory storage medium, comprising:
at least one set of instructions for automatically pasting a candidate string from a clipboard to an interface displayed on an intelligent terminal, the at least one set of instructions, when executed by at least one processor, direct the at least one processor to perform acts of:
obtaining the candidate string copied by a user from the clipboard of the intelligent terminal;
obtaining a first time, wherein the first time is a time when the candidate string was copied to the clipboard;
obtaining a second time, wherein the second time is a time when the user visited the interface subsequent to the first time;
calculating a time difference between the first time and the second time;
determining whether the time difference is less than a preset reference time;
when it is determined that the time difference is less than a preset reference time, indicating that an intention of the user is to paste the candidate string in a designated location of the interface displayed on the intelligent terminal;
searching an auto-paste record and determining whether the candidate string is in the auto-paste record; and
displaying the candidate string in the designated location of the interface without receiving an instruction to paste from the user when the intention of the user is indicated to paste the candidate string in the designated location of the interface and when the candidate string is not in the auto-paste record.

14. The processor-readable non-transitory storage medium according to claim 13, wherein:
the interface is a web browsing page;
the designated location is a web address bar on the web browsing page; and
the obtaining of the candidate string comprises:
determining whether the candidate string is a Uniform Resources Location (URL); and
obtaining the URL from the clipboard by calling an application programming interface function.

15. The processor-readable non-transitory storage medium according to claim 13, wherein the auto-paste record is a list of strings that were historically displayed in the designated location of the interface.

16. The processor-readable non-transitory storage medium according to claim 13, wherein:
the designated location of the interface requires a predetermined format for a string to be displayed therein; and
the displaying the candidate string in the designated location of the interface without receiving the instruction to paste from the user when the intention of the user is indicated to paste the candidate string in the designated location of the interface and when the candidate string is not in the auto-paste record further comprises:
displaying the candidate string when the designated location of the interface is empty or when a preexisting string in the designated location of the interface does not conform with the predetermined format.

17. The processor-readable non-transitory storage medium according to claim 13, wherein:
the candidate string is copied from a source other than the interface; and the displaying the candidate string in the designated location of the interface without receiving the instruction to paste from the user when the intention of the user is indicated to paste the candidate string in the designated location of the interface and when the candidate string is not in the auto-paste record occurs when the user leaves the source and visits the interface.

\* \* \* \* \*